United States Patent
Duffy et al.

(10) Patent No.: US 8,631,668 B2
(45) Date of Patent: Jan. 21, 2014

(54) SYSTEM FOR AND METHOD OF MIXED-COLOR CULLET CHARACTERIZATION AND CERTIFICATION, AND PROVIDING CONTAMINANT-FREE, UNIFORMLY COLORED MIXED-COLOR CULLET

(75) Inventors: Sean Duffy, Charlotte, NC (US);
Warren Blasland, Wellington, FL (US);
Rick Lehman, Princeton, NJ (US)

(73) Assignee: MPH Energy LLC, Rutland, VT (US)

( * ) Notice: Subject to any disclaimer, the term of this patent is extended or adjusted under 35 U.S.C. 154(b) by 917 days.

(21) Appl. No.: 11/270,654

(22) Filed: Nov. 10, 2005

(65) Prior Publication Data

US 2006/0122725 A1 Jun. 8, 2006

Related U.S. Application Data

(60) Provisional application No. 60/626,973, filed on Nov. 12, 2004.

(51) Int. Cl.
*G06F 19/00* (2011.01)

(52) U.S. Cl.
USPC ....... 65/29.11; 65/134.1; 65/134.3; 65/134.8; 65/135.9; 65/136.3

(58) Field of Classification Search
USPC .......................... 65/29, 134.1, 134.3, 134.8, 65/135.9–136.3
See application file for complete search history.

(56) References Cited

U.S. PATENT DOCUMENTS

| | | | |
|---|---|---|---|
| 3,003,886 A | 10/1961 | Pither | |
| 3,790,091 A | 2/1974 | Law et al. | |
| 3,802,558 A | 4/1974 | Rhys | |
| 3,804,249 A | 4/1974 | Gibbons et al. | |
| 3,848,813 A | 11/1974 | Stanczyk et al. | |
| 3,907,670 A | 9/1975 | Fernandes | |
| 3,922,975 A | 12/1975 | Reese | |
| 4,044,695 A | 8/1977 | Mackenzie et al. | |
| 4,069,145 A | 1/1978 | Sommer, Jr. et al. | |
| 4,070,273 A | 1/1978 | Morey | |

(Continued)

FOREIGN PATENT DOCUMENTS

| | | |
|---|---|---|
| DE | 19953208 | 5/2000 |
| DE | 10135678 | 2/2003 |

(Continued)

OTHER PUBLICATIONS

E. Joseph Duckett, "The Influence of Color Mixture on the Use of Glass Cullett Recovered from Municipal Solid Waste" Conservation & Recycling, vol. 3, No. 2 pp. 175-185 (1979).

(Continued)

*Primary Examiner* — Daniel McNally
*Assistant Examiner* — Margaret Squalls

(57) ABSTRACT

Methods of creating a batch of recycled glass from mixed color glass cullet. In one embodiment, the method includes receiving at a glass plant a weight and color composition percentage of a first batch of mixed color cullet. The glass plant also receives a weight and color composition percentage of a second batch of mixed color cullet. The weight and color composition percentage of the first batch and the second batch are combined to generate a combined weight and composition percentage. The combined weight and composition are percentage are used to generate, automatically at a glass plant, a formulation to produce glass of a desired color.

16 Claims, 5 Drawing Sheets

(56) References Cited

U.S. PATENT DOCUMENTS

| | | | |
|---|---|---|---|
| 4,072,273 A | 2/1978 | Reiniger | |
| 4,201,551 A | 5/1980 | Lyshkow et al. | |
| 4,204,906 A | 5/1980 | Liu | |
| 4,245,999 A | 1/1981 | Reiniger | |
| 4,265,636 A | 5/1981 | Frankiewicz | |
| 4,297,322 A | 10/1981 | Liu | |
| 4,341,353 A | 7/1982 | Hamilton et al. | |
| 4,353,713 A | 10/1982 | Cheng | |
| 4,387,019 A | 6/1983 | Dale et al. | |
| 4,399,029 A | 8/1983 | Clin et al. | |
| 4,457,772 A | 7/1984 | Haynes et al. | |
| 4,533,053 A | 8/1985 | Kenny et al. | |
| 4,553,977 A | 11/1985 | Fry | |
| 4,678,860 A | 7/1987 | Kuester | |
| 4,778,116 A | 10/1988 | Mayberry | |
| 4,832,204 A | 5/1989 | Handy et al. | |
| 4,844,351 A | 7/1989 | Holloway | |
| 4,874,134 A | 10/1989 | Wiens | |
| 5,009,370 A | 4/1991 | Mackenzie | |
| 5,014,996 A | 5/1991 | von Braunhut | |
| 5,048,694 A | 9/1991 | Iwamoto et al. | |
| 5,071,075 A | 12/1991 | Wiens | |
| 5,091,077 A | 2/1992 | Williams | |
| 5,104,047 A | 4/1992 | Simmons | |
| 5,104,419 A | 4/1992 | Funk | |
| 5,150,307 A | 9/1992 | McCourt et al. | |
| 5,184,780 A | 2/1993 | Wiens | |
| 5,234,109 A | 8/1993 | Pederson | |
| 5,250,100 A | 10/1993 | Armbristor | |
| 5,263,591 A | 11/1993 | Taormina et al. | |
| 5,278,282 A | 1/1994 | Nauman et al. | |
| 5,299,693 A | 4/1994 | Ubaldi et al. | |
| 5,314,071 A | 5/1994 | Christian et al. | |
| 5,333,797 A | 8/1994 | Becker et al. | |
| 5,333,886 A | 8/1994 | Sanders | |
| 5,344,025 A | 9/1994 | Tyler et al. | |
| 5,356,082 A | 10/1994 | Prinz et al. | |
| 5,366,093 A | 11/1994 | Huber | |
| 5,370,234 A | 12/1994 | Sommer, Jr. et al. | |
| 5,419,438 A | 5/1995 | Squyres et al. | |
| 5,443,157 A | 8/1995 | Baker et al. | |
| 5,461,136 A | 10/1995 | Krutak et al. | |
| 5,464,100 A | 11/1995 | Oka et al. | |
| 5,465,847 A | 11/1995 | Gilmore | |
| 5,470,918 A | 11/1995 | Tsutumi et al. | |
| 5,485,925 A | 1/1996 | Miller et al. | |
| 5,503,788 A | 4/1996 | Lazareck et al. | |
| 5,547,134 A | 8/1996 | Rubenstein et al. | |
| 5,555,984 A | 9/1996 | Sommer, Jr. et al. | |
| 5,588,598 A | 12/1996 | Becker et al. | |
| 5,611,493 A | 3/1997 | Hayashi et al. | |
| 5,638,959 A | 6/1997 | Sommer, Jr. et al. | |
| 5,667,079 A | 9/1997 | Jongebloed | |
| 5,675,416 A | 10/1997 | Campbell et al. | |
| 5,718,737 A * | 2/1998 | Mosch | 65/30.1 |
| 5,740,918 A | 4/1998 | Hayashi et al. | |
| 5,794,788 A | 8/1998 | Massen et al. | |
| 5,890,663 A | 4/1999 | Strach et al. | |
| 5,902,976 A | 5/1999 | Beasley | |
| 5,922,090 A | 7/1999 | Fujimura et al. | |
| 5,971,162 A | 10/1999 | Allagnat et al. | |
| 5,988,395 A | 11/1999 | Calo et al. | |
| 6,000,639 A | 12/1999 | Ganguli | |
| 6,124,560 A | 9/2000 | Roos et al. | |
| 6,144,004 A * | 11/2000 | Doak | 209/581 |
| 6,144,044 A | 11/2000 | Yoshinaga et al. | |
| 6,152,306 A | 11/2000 | Miller | |
| 6,168,102 B1 | 1/2001 | Bergart | |
| 6,230,521 B1 * | 5/2001 | Lehman | 65/29.11 |
| 6,264,038 B1 | 7/2001 | Schmidt et al. | |
| 6,401,936 B1 | 6/2002 | Isaacs et al. | |
| 6,423,878 B2 | 7/2002 | Reverso et al. | |
| 6,446,813 B1 | 9/2002 | White et al. | |
| 6,464,082 B1 | 10/2002 | Kimmel et al. | |
| 6,467,708 B1 | 10/2002 | Terzini et al. | |
| 6,484,886 B1 | 11/2002 | Isaacs et al. | |
| 6,578,783 B2 | 6/2003 | Simon et al. | |
| 6,763,280 B1 * | 7/2004 | Lehman | 700/157 |
| 6,902,065 B2 | 6/2005 | Kimura et al. | |
| 6,945,484 B1 | 9/2005 | Terzini et al. | |
| 6,974,097 B2 | 12/2005 | Simon et al. | |
| 7,188,730 B2 | 3/2007 | Centers et al. | |
| 7,252,691 B2 | 8/2007 | Philipson et al. | |
| 7,264,124 B2 | 9/2007 | Bohlig et al. | |
| 7,302,407 B2 | 11/2007 | Bohlig et al. | |
| 7,341,156 B2 | 3/2008 | Bohlig et al. | |
| 7,351,929 B2 | 4/2008 | Afsari et al. | |
| 7,355,140 B1 | 4/2008 | Afsari | |
| 7,389,880 B2 | 6/2008 | Goldmann et al. | |
| 7,449,655 B2 | 11/2008 | Cowling et al. | |
| 2003/0001726 A1 | 1/2003 | Moore | |
| 2003/0015461 A1 | 1/2003 | Miyamoto et al. | |
| 2003/0133484 A1 | 7/2003 | Kimura et al. | |
| 2004/0095571 A1 | 5/2004 | Bourely et al. | |
| 2004/0133484 A1 | 7/2004 | Kreiner et al. | |
| 2004/0140248 A1 | 7/2004 | Dauzvardis et al. | |
| 2005/0032920 A1 | 2/2005 | Norbeck et al. | |
| 2005/0035032 A1 | 2/2005 | McGee | |
| 2005/0126958 A1 | 6/2005 | Bohlig et al. | |
| 2006/0085212 A1 | 4/2006 | Kenny | |
| 2007/0099038 A1 | 5/2007 | Galloway | |
| 2007/0187299 A1 | 8/2007 | Valerio | |
| 2008/0014112 A1 | 1/2008 | Lee et al. | |
| 2008/0020456 A1 | 1/2008 | Choate et al. | |
| 2008/0061124 A1 | 3/2008 | Langlois et al. | |
| 2008/0061125 A1 | 3/2008 | Langlois et al. | |
| 2008/0085212 A1 | 4/2008 | Adams et al. | |
| 2008/0105597 A1 | 5/2008 | Miller et al. | |
| 2008/0156703 A1 | 7/2008 | Kenny | |
| 2008/0197056 A1 | 8/2008 | Kenny | |
| 2008/0197058 A1 | 8/2008 | Kenny | |
| 2009/0114571 A1 | 5/2009 | Miller et al. | |

FOREIGN PATENT DOCUMENTS

| | | |
|---|---|---|
| EP | 0439674 | 8/1991 |
| GB | 1450940 | 9/1976 |
| GB | 1528236 | 10/1978 |
| GB | 2395887 | 6/2004 |
| GB | 2419551 | 5/2006 |
| JP | 2001-058846 | 3/2001 |
| JP | 2001-189203 | 7/2001 |
| WO | WO-03/086733 | 10/2003 |

OTHER PUBLICATIONS

European Search Report for EP 05 25 6769 dated Jan. 13, 2006.
Form PCT/ISA/220: Notification of Transmittal of the International Search Report and the Written Opinion from corresponding PCT Application No. PCT/US2005/039464 dated Dec. 4, 2006.
Form PCT/ISA/210: International Search Report from corresponding PCT Application No. PCT/US2005/039464 dated Dec. 4, 2006.
Form PCT/ISA/237: Written Opinion of corresponding PCT Application No. PCT/US2005/039464 dated Dec. 4, 2006.
US 5,041,996, 08/1991, Emering (withdrawn).
"Einsatz Von Mogensen Vibro-Stangensizer Beim Altglas-Recycling." Aufbereitungs-Technik, 33, Aug. 1, 1992 (3 pages).
Capel et al. "Waste sorting—a look at the separation and sorting techniques in today's european market." Waste Management World Magazine (Available online at http://www.waste-management-world.com/display_article/339838/123/CRTIS/none) Jul. 2008 (6 pages).
Envirosris Knowledge Innovative Solutions, "Final Report—Material Recycling Facility Technology Review—WDO Project Code OPT-R3-05," The City of Ottawa, Jul. 2001 (38 pages).
European Search Report for European Patent Application No. 05254328.7 dated Oct. 14, 2005 (3 pages).
European Search Report for European Patent Application No. 05254327.9 dated Oct. 14, 2005 (2 pages).
eWasteTech.com News "Crisp County Build New Waste Processing Plant." (Available online at http://www.ewastetech.com/pr02.htm) Aug. 1997 (1 page).

(56) References Cited

OTHER PUBLICATIONS

Hendrix, et al. "Technologies for the Identification, Separation, and Recycling of Automotive Plastics." International Journal of Environmentally Conscious Design and Manufacturing Mar. 1996 (24 pages).

Lotfi, A. "Plastic Recycling," Plastic/Polymer Recycling. (Available online at http://www.lotfi.net/recycle/plastic.html) Applied Spectroscopy, Jun. 1997 (17 pages).

MEEF Plastic Recycling, "Plastic Recycling—The Problem with PVC," (Available online at http://www.engforum.com/recycling/PVC.htm) Mar. 7, 2006 (4 pages).

PCT/US05/24681 International Search Report mailed Dec. 20, 2006 (2 pages).

PCT/US05/24687 International Search Report mailed Jan. 4, 2008 (4 pages).

PCT/US08/062249 International Search Report mailed Aug. 14, 2008 (2 pages).

R.E.D. Recycling Engineering & Development Ltd "Scrap Metal Processing, Down Stream Systems." (Available online at http://www.redltd.co.uk/scrap_metal.php4) 2009 (4 pages).

Ramasubramanian et al. "Sensor Systems for high speed intelligent sorting of waste paper in recycling," North Carolina State University (28 pages).

RRT Design & Construction. "Technologies & Products—Product Diversity." (Available online at http://web.archive.org/web/20080207032542/www.rrtenviro.com) 2003 (7 pages).

Solano et al. "Life-cycle based solid waste management. I: Model Development," J. of Environmental Engineering, Oct. 2002 (12 pages).

Tim Goodman & Associates, "Materials Recovery Facilities Operational Assessment Final Report and Optimization Guide", Aug. 11, 2003 (45 pages).

TiTech, "TiTechPolySort," (Available online at http://www.titech.com/default.asp?V_ITEM_ID=484) 2006 (5 pages).

Wahab et al. "Development of a Prototype Automated Sorting System for Recycling." Amer. J. of App. Sciences. 3:7 (5 pages).

\* cited by examiner

SYSTEM FOR AND METHOD OF MIXED-COLOR CULLET CHARACTERIZATION AND CERTIFICATION, AND PROVIDING CONTAMINANT-FREE, UNIFORMLY COLORED MIXED-COLOR CULLET

RELATED APPLICATIONS

This application claims the benefit of U.S. Provisional Patent Application No. 60/626,973, filed Nov. 12, 2004, which is incorporated herein by reference.

FIELD OF THE INVENTION

The present invention relates to the field of glass production and, more particularly, to systems and methods for providing substantially uniformly colored, contaminant-free, mixed-color cullet, and characterizing and/or certifying the composition of mixed-color cullet.

BACKGROUND OF THE INVENTION

Entities within a glass recycling process stream, such as material recovery facilities (MRFs) and beneficiators, encounter challenges in performing color-sorting and recovering adequate quantities of glass that meet the quality standards for recycled material. A MRF's traditional function has been to serve as a drop-off and sorting point for recycled materials. MRFs sort mixed glass by color into amber, green, and flint glass. Beneficiators typically receive sorted glass from MRFs and then clean and process the glass to make the glass acceptable as source material for bottle production.

However, a quantity of glass is shattered during processing. This by-product of the sorting process is known as mixed cullet, as it is a mix of amber, green, and flint glass shards. Thus, under the traditional processing system, beneficiators amass stockpiles of mixed cullet, which may be used as landfill cover or as a road material (e.g., as a constituent of asphalt). If a beneficiator wishes to extract a higher value from the mixed cullet, the beneficiator is forced to try the difficult and costly task of optically sorting these stockpiles of mixed glass by color.

To date, mixed cullet has thus had only limited commercial use. For example, mixed cullet is typically limited to uses such as an aggregate in paving material, landfill cover, or some similar use. Mixed cullet often is discarded in landfills.

We have discovered that it would be beneficial to develop a process for re-using mixed colored glass, wherein mixed cullet can be used, like color-sorted cullet, in a recycling process to make new glass products. We have also discovered that is would be useful to generate a market for three-color mixed cullet, thereby reducing or eliminating the amount of mixed-color cullet that is discarded.

However, the composition of C3MC from a particular beneficiator varies with time, and the composition of the material from different beneficiators is not uniform. Furthermore, the composition of C3MC may not be accurate to specification. Any difference between a C3MC specification that may be used to manufacture new glass products and the actual composition of supplied C3MC results in substandard glass that is inconsistent with glass manufactured from other batches. Thus, the composition of C3MC from various beneficiators must be known, tracked, and recorded to allow glass manufacturers (also known as "glass plants") to modify, as may be necessary, the mix of C3MC, as it arrives, with other glass of complementary composition to produce a final blend of C3MC that can be utilized in conjunction with standard processing techniques.

We have determined that it would be useful to provide a system and method for processing post-consumer glass into mixed cullet so that, for example, it satisfies glass manufacturer/plant requirements for purity (e.g., minimal organic, ferrous, paper, plastic and other light fraction, ceramic, and/or aluminum contaminants commingled with the mixed cullet). We have also determined that it would be useful to provide a system and method that uniformly maintains predetermined percentage ranges of amber, green, and flint glass in mixed cullet for a consistent feed stream to glass manufacturers/plants. Providing definite color ranges of mixed cullet ensures that glass manufacturing techniques are changed as infrequently as possible, which increases productivity and reduces cost by, for example, eliminating the need for analysis by the glass manufacturer/plant in order to determine C3MC composition.

We have also determined that it would be useful to facilitate the use of blended C3MC shipped from multiple beneficiators. Glass plants could then advantageously utilize the resulting C3MC blend in conjunction with standard processing techniques to produce new glass products, based upon the consolidation of the various C3MC loads of differing composition.

We have also determined that it would be useful to provide a system and method that provides substantially pure mixed cullet, whereby impurities such as, for example, organic, ferrous, paper, plastic (and other light fraction), ceramic, and/or aluminum contaminants are removed from post-consumer recycled glass.

LIST OF FIGURES

DESCRIPTION OF EMBODIMENTS OF THE INVENTION

Embodiments of the present invention are directed to systems and methods of characterizing and certifying mixed color cullet produced by beneficiators and/or material recovery facilities (MRFs). Although three color mixed-cullet (C3MC) is generally referred to herein, the present invention may also be equally utilized in connection with any type of mixed cullet, such as two-, four-, or five-color mixed cullet.

Providing C3MC profile data with shipments of C3MC produced by a beneficiator and/or MRF allows glass manufacturers/plants to know the relative color composition of the C3MC, and thus make adjustments to the glass formulation to ensure that the end-product meets a predetermined color specification. Additionally, the compilation and storage of C3MC profile data provides a way to track C3MC composition over time, which may affect orders, pricing, composition requests, process management, and/or contract negotiations. Additionally, because the color composition of C3MC is known to the glass manufacturer/plant, this allows stockpiles of C3MC from different sources or different batches to be blended, in order to achieve a preferred C3MC blend. Further, because the color composition of C3MC is known to the glass manufacturer/plant, embodiments of the present invention eliminate the need for sampling and/or sample analysis by glass manufacturers/plants in order to determine C3MC composition.

Figure 1:
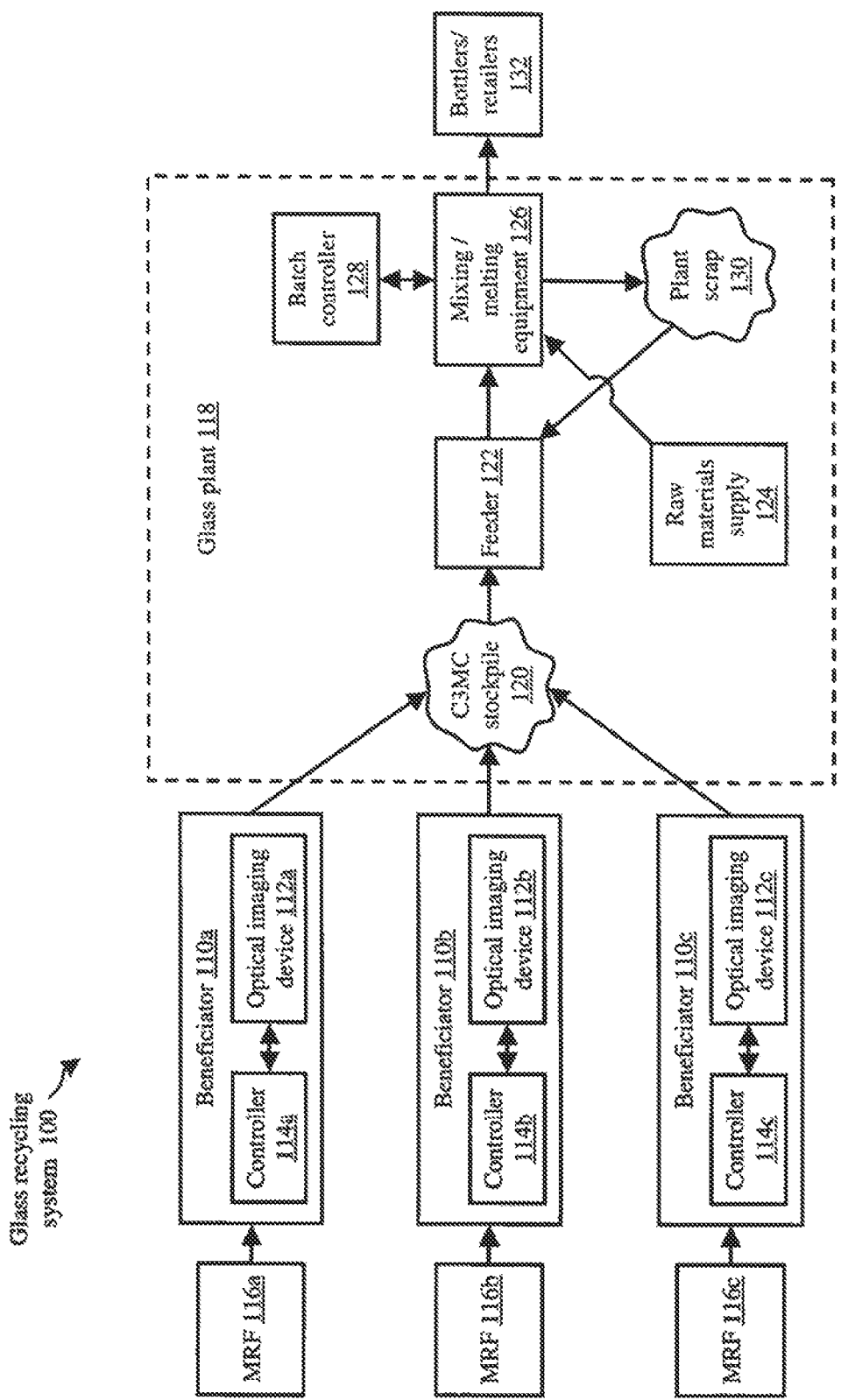
FIG. 1 illustrates a functional block diagram of an exemplary glass recycling system in accordance with an embodiment of the invention.

FIG. 1 illustrates a functional block diagram of a glass recycling system 100 in accordance with an exemplary embodiment of the invention. Glass recycling system 100 may include a plurality of beneficiators 110a-c, each respectively including an optical imaging device 112a-c and controller 114a-c. MRF 116a-c respectively supply beneficiators 110a-c with 3CMC. However, any single MRF 116a-c may supply any single beneficiator 110a-c or combination of beneficiators 110a-c. Any number of optical imaging devices 112a-c may be utilized to suit processing requirements.

MRFs 116a-c are representative of any number of conventional, solid waste processing plants that are primarily responsible for receiving and sorting recyclable material received from collectors. This recyclable material typically has been collected from sources such as residential curbsides, community drop-off points, and/or reverse vending sites.

Upon receipt of such material, MRFs 116a-c process the material, generally by sorting recyclables from non-recyclables, and further sorting recyclables by material type, such as glass, plastic and paper. Glass that is sorted is further sorted for contaminants, such as ceramics, prior to being shipped to beneficiators 110a-c. Additionally, the glass processed by MRFs 116a-c may be crushed, for example, to maximize shipping loads. After MRFs 116a-c process the glass, the glass is transported to one or more beneficiator 110a-c.

Beneficiators 110a-c are primarily responsible for cleaning and purifying glass so that it is suitable for use by a glass plant. In one embodiment, beneficiators 110a-c produce C3MC of a sufficient quality such that it may be used, for example, in connection with U.S. Pat. No. 5,718,737, entitled, "Method of Recycling Mixed Colored Cullet into Amber, Green, or Flint Glass," U.S. Pat. No. 6,230,521, entitled, "Method of Recycling Batches of Mixed-Color Cullet into Amber, Green, or Flint Glass with Selected Properties," and/or U.S. Pat. No. 6,763,280, entitled "Automated Process for Recycling Batches of Mixed Color Cullet into Amber, Green, or Flint Glass with Selected Properties," each of which are incorporated herein by reference. The associated C3MC technology allows the direct use of three-color (e.g., green, amber, and flint) mixed cullet in glass manufacturing and, therefore, reduces and/or eliminates the need for color-sorting recycled glass prior to its re-use in the production of glass articles. An example C3MC color distribution is approximately 55% flint, 30% amber, and 15% green.

Optical imaging devices 112a-c are standard optical imaging devices, such as a Clarity-Plus model from Binder and Co. (Gleisdorf, Austria), that can be used to image, analyze the composition of, and sort cullet into three separate bins of varying color. For example, each optical imaging device 112a-c can be positioned at a location near the final output of its respective beneficiator 110a-c, and thereby perform a color profiling operation that records the final color composition of the C3MC produced by a beneficiator 110a-c. Other optical imaging devices may be utilized within beneficiator 110a-c for general sorting purposes. In addition to color profiling, optical imaging devices 112a-c may also do contaminant profiling. For example, color and contaminant analysis of the C3MC may be performed by standard methods or techniques that utilize, for example, optical and/or chemical composite color constitution.

Controllers 114a-c may be implemented, for example, as a conventional computer, such as a personal computer, configured with or utilizing control software used for storing C3MC specification data. Controllers 114a-c are electrically connected to its associated optical imaging device 112a-c using, for example, conventional network link, such as an Ethernet link. Controllers 114a-c respectively process information obtained by optical imaging devices 112a-c, and provide a profile or specification sheet for the C3MC produced by its associated beneficiator 110a-c. C3MC specification data may be compiled and/or stored by controllers 114a-c for individual shipments (e.g., by the truckload), and/or on a daily, weekly, and/or monthly basis. In this way, shipments of C3MC from beneficiator 110a-c are accompanied by associated certification or specification data. As shown in glass recycling system 100 of FIG. 1, shipments of C3MC from beneficiators 110a-c are received by a glass plant 118 to form C3MC stockpile 120. Because stockpile 120 for each glass plant 118 can be supplied by a different beneficiator(s) 110a-c, the color composition of stockpile 120 for each glass plant 118 will typically vary.

As shown in FIG. 1, glass plant 118 may include, for example, feeder 122, raw materials supply 124, mixing/melting equipment 126, batch controller 128, an accumulation of plant scrap 130. Glass plant can send its output to bottler/retailer 132. Glass plant 118 receives C3MC from beneficiators 110a-c and, by using the C3MC technology and software, is able to introduce recycled mixed glass, i.e., C3MC, into its existing glass manufacturing process to make color-specific glass articles, such as amber bottles.

Feeder 122 is a conventional feeding mechanism, such as an electronic vibrating conveyor belt feeder, that transports C3MC from stockpile 120 to a mixing stage (not shown). Raw materials supply 124 is representative of any device for handling, feeding, and analyzing the raw materials. Raw materials supply 124 includes a collection of typical raw material elements for making glass, such as sand, soda ash, limestone, and nepheline syenite. One or more raw materials elements are typically blended with some percentage of C3MC from C3MC stockpiles 120 via a mixing stage (not shown).

The output of feeder 122 and raw materials supply 124 may be provided to mixing/melting equipment 126, which may include or utilize a standard mixing stage (not shown) for blending the C3MC and raw materials. The output of mixing stage can be fed to a melting stage (not shown) that melts the raw materials. The melted raw material, typically in the form of a viscous liquid, is provided to equipment (not shown), such as bottle-forming equipment. For example, standard cooling/annealing stage equipment (not shown) can be used to cool and anneal the produced glass product(s) (e.g., bottles). The produced glass products can be inspected before the final product is shipped, for example, to bottlers/retailers 132. The final inspection stage may be performed to determine whether final glass product meets the expected quality and color specifications.

Batch controller 128 may be implemented, for example, as a conventional computer, such as a personal computer, configured to operate with and/or utilize control software that stores and manages the glass formulation and mixing parameters of glass plant 118. Batch controller 128 thus controls the feed of C3MC from feeder 122 and raw materials from raw materials supply 124 to the mixing stage within mixing/melting equipment 126. Batch formulation mixing parameters may be manually entered into batch controller 128 and/or plant batch weigh-out and mixing equipment. Alternatively, batch formulation mixing parameters may be electronically integrated with, for example, the plant batch weigh-out and mixing equipment. In one embodiment, batch controller 128 may utilize, for example, methods and/or techniques as disclosed, for example, in U.S. Pat. No. 6,230,521 to manage the glass formulation and mixing parameters of glass plant 118.

Plant scrap 130 is (surplus) green, amber, flint and/or mixed glass that is generated as a byproduct of the glass manufacturing process. Glass of any particular color from plant scrap 130 may be fed back into the mixing stage within mixing/melting equipment 126 for blending with the C3MC from feeder 122 and raw materials from raw materials supply 124, under the control of batch controller 128.

The operation of glass recycling system 100 is as follows. Glass processed by MRFs 116a-c is transported to one or more of beneficiators 110a-c, where the glass is further cleaned and purified. During processing, a portion of the glass becomes C3MC. Optical imaging devices 112a-c perform a color and contaminant profiling operation, and transmit their image data to controllers 114a-c, respectively, for compilation and storage. Controllers 114a-c provide a color and contaminant composition profile or specification sheet for C3MC that is respectively produced by beneficiators 110a-c. The C3MC specification data may be compiled by controllers 114a-c in any increment, such as truckload-by-truckload, daily, weekly, monthly and/or yearly, and be accessible to batch controller 128 (by using, for example, an internet connection or other network connection).

C3MC from beneficiators 110a-c, with their associated composition profile, is subsequently provided to glass plant 118 for use in mixing/melting equipment 126. As a result, at glass plant 118, C3MC stockpile 120 is formed from an accumulation of C3MC that originates from one or more of beneficiator 110a-c. As a result, C3MC stockpile 120 has a color composition that is accumulated from beneficiators 110a-c. The C3MC profile information received with each shipment of C3MC by glass plant 118 includes, for example, the location of the supplying beneficiator 110a-c, the weight of the delivery (e.g., a typical truckload provides 20-25 tons of C3MC), the green, amber, or flint color composition, the contaminant composition and/or average glass size.

As glass plant 118 receives each shipment of C3MC from beneficiators 110a-c, the associated profile data is stored within batch controller 128. Subsequently, and based upon the C3MC profile data, batch controller 128 makes real-time or near real-time adjustments to the batch formulation utilized by mixing/melting equipment 126. For example, batch controller 128 may direct that a specific quantity of C3MC from stockpile 120 be mixed with a specific quantity raw materials supply 124 and a specific quantity plant scrap 130. Additionally, batch controller 128 can make other real-time color adjustments, such as adding (additional) copper oxide.

In summary, the C3MC profile data associated with each shipment of C3MC is provided to batch controller 128 for use in making adjustments to the glass formulation. This ensures that the end-product leaving mixing/melting equipment 126 and delivered to bottlers/retailers 132 meets a predetermined color specification. Additionally, the compilation and storage of C3MC profile data within controllers 114a-c of beneficiators 110a-c and batch controller 128 of glass plant 118 provides a way to track C3MC composition over time, which may affect, for example, orders, pricing, composition requests, process management, and/or contract negotiations.

Additionally, because the color composition of C3MC is known to glass plant 118, this allows stockpiles of C3MC from different sources or different batches to be blended to achieve a preferred C3MC blend. Also, because the color composition of C3MC is known to glass plant 118, embodiments of the present invention eliminate the need for sampling and sample analysis by the glass plant 118 in order to determine C3MC composition and subsequent glass formulation adjustments.

Figure 2:
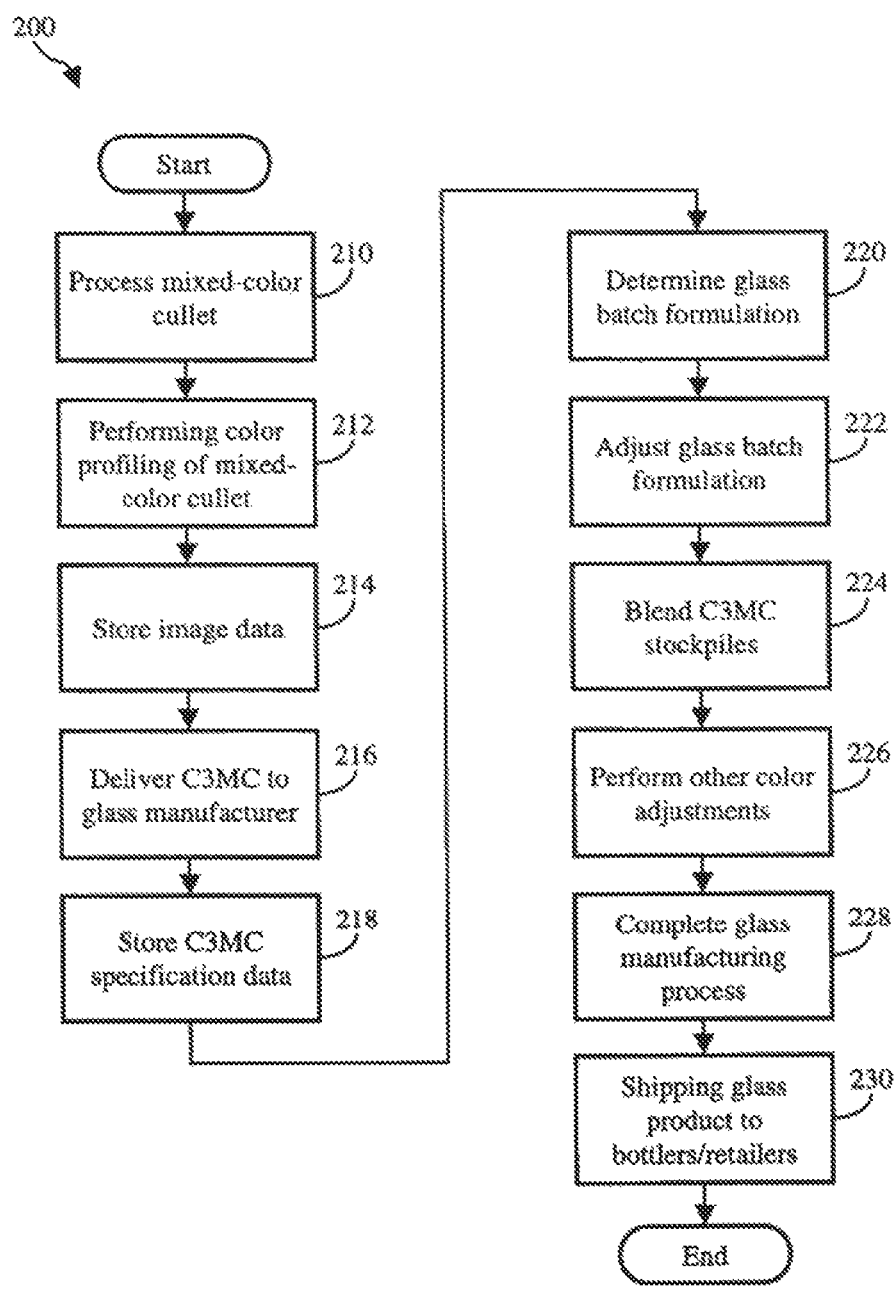
FIG. 2 illustrates a flow diagram of an exemplary method of mixed-color cullet characterization and certification for glass batch formulations in accordance with an embodiment of the invention.

FIG. 2 illustrates a flow diagram of an exemplary method 200 of mixed-color cullet characterization and certification for glass batch formulations in accordance with an embodiment of the present invention.

At step 210, mixed-color cullet is processed at beneficiator 110a-c. Glass processed by MRFs 116a-c is transported to beneficiators 110a-c, where the recycled glass is further cleaned and purified, in which at least a portion thereof generally results in or becomes C3MC.

At step 212, the mixed-color cullet is color profiled. Optical imaging devices 112a-c perform a color and contaminate profiling (e.g., analysis) operation to determine the percent content of each color and contaminate level within the C3MC being shipped from beneficiators 110a-c. Optical imaging devices 112a-c then transmit their image data to controllers 114a-c, respectively.

At step 214, image data is stored, for example, at a beneficiator 110a-c. For example, image data received from optical imaging devices 112a-c is stored, thereby providing a color composition profile or specification sheet for the C3MC that is respectively produced by beneficiators 110a-c. C3MC specification data may be compiled by controllers 114a-c in any increment, such as by truckload, daily, weekly, monthly, or yearly. Additionally, the C3MC specification data may include, for example, the location of the supplying beneficiator 110a-c, the weight of the delivery (e.g., typical truckload is 20-25 tons of C3MC), the green, amber, or flint color composition, the contaminant composition, and/or the particle size.

At step 216, C3MC is delivered to glass plant 118. C3MC from beneficiators 110a-c, with their associated specification data, is subsequently delivered to glass plant 118 for use in its mixing/melting equipment 126. As a result, at glass plant 118, C3MC stockpile 120 is formed from the C3MC that originates from beneficiators 110a-c. As a result, C3MC stockpile 120 may have a unique color composition.

At step 218, C3MC specification data is stored or used by glass plant 118. As glass plant 118 receives each shipment of C3MC from beneficiators 110a-c, the associated specification data can be stored, for example, within batch controller 128.

At step 220, glass batch formulations are determined. Glass batch formulation can be determined by using the stored C3MC specification data as input parameters to a software routine that is used for determining the glass batch formulation as specified, for example, in U.S. Pat. No. 6,230,521, entitled, "Method of Recycling Batches of Mixed-Color Cullet into Amber, Green, or Flint Glass with Selected Properties," which is incorporated herein by reference.

At step 222, the glass batch formulation is adjusted at glass plant 118 in accordance with, for example, the C3MC-specific glass batch formulation established in step 220. More specifically, batch controller 128 can make real-time and/or near real-time adjustments to the batch formulation within mixing/melting equipment 126 based, for example, upon the C3MC specification data accessible to batch controller 128 via, for example, network or internet connection, by using the techniques disclosed, for example, U.S. Pat. No. 6,230,521.

Such adjustments may include, for example, requesting a specific quantities of C3MC from C3MC stockpile 120 to be blended with a specific quantity of raw materials from raw materials supply 124 and, optionally, with glass fragments from plant scrap 130.

At step 224, C3MC stockpiles are blended. In this step, and as determined in step 220, under the control and direction of batch controller 128, a further color composition of C3MC may be formed and fed into mixing/melting equipment 126 by combining specific quantities of C3MC stockpile 120 with plant scrap 130, thereby providing improved C3MC stockpile management at glass plant 118. For example, an additional C3MC stockpile is formed of a blend of C3MC stockpile 120 and plant scrap 130. In this way, material from C3MC stockpiles 120 and plant scrap 130 are blended to form a stockpile of C3MC that has preferred color composition, as determined by batch controller 128, for feeding into mixing/melting equipment 126.

At step 226, other color adjustments may be performed. For example, batch controller 128 makes any other real-time color adjustments, such as adding additional copper oxide to the batch formulation to compensate for high levels of green cullet in the batch for amber glass.

At step 228, mixing/melting equipment 126 performs the well-known glass manufacturing process that includes standard sequential manufacturing stages, such as the outputs of feeder 122 and raw materials supply 124 feeding a mixing stage for blending the C3MC and raw materials. The mixing stage subsequently feeds a melting stage for heating and thereby melts the raw materials. The end product is formed from the viscous liquid from the melting stage via a bottle-forming stage that performs a standard glass blowing or press and blowing process that subsequently feeds a cooling/annealing stage, wherein the end product, such as a bottle, is slowly cooled and annealed. The end product is fed to a final inspection stage before the final glass product, such as amber bottles, is shipped to bottlers/retailers 132. The final inspection stage determines whether final glass product meets the expected quality and color specifications. At step 230, glass products are shipped, for example, to bottlers/retailers.

Figure 3:
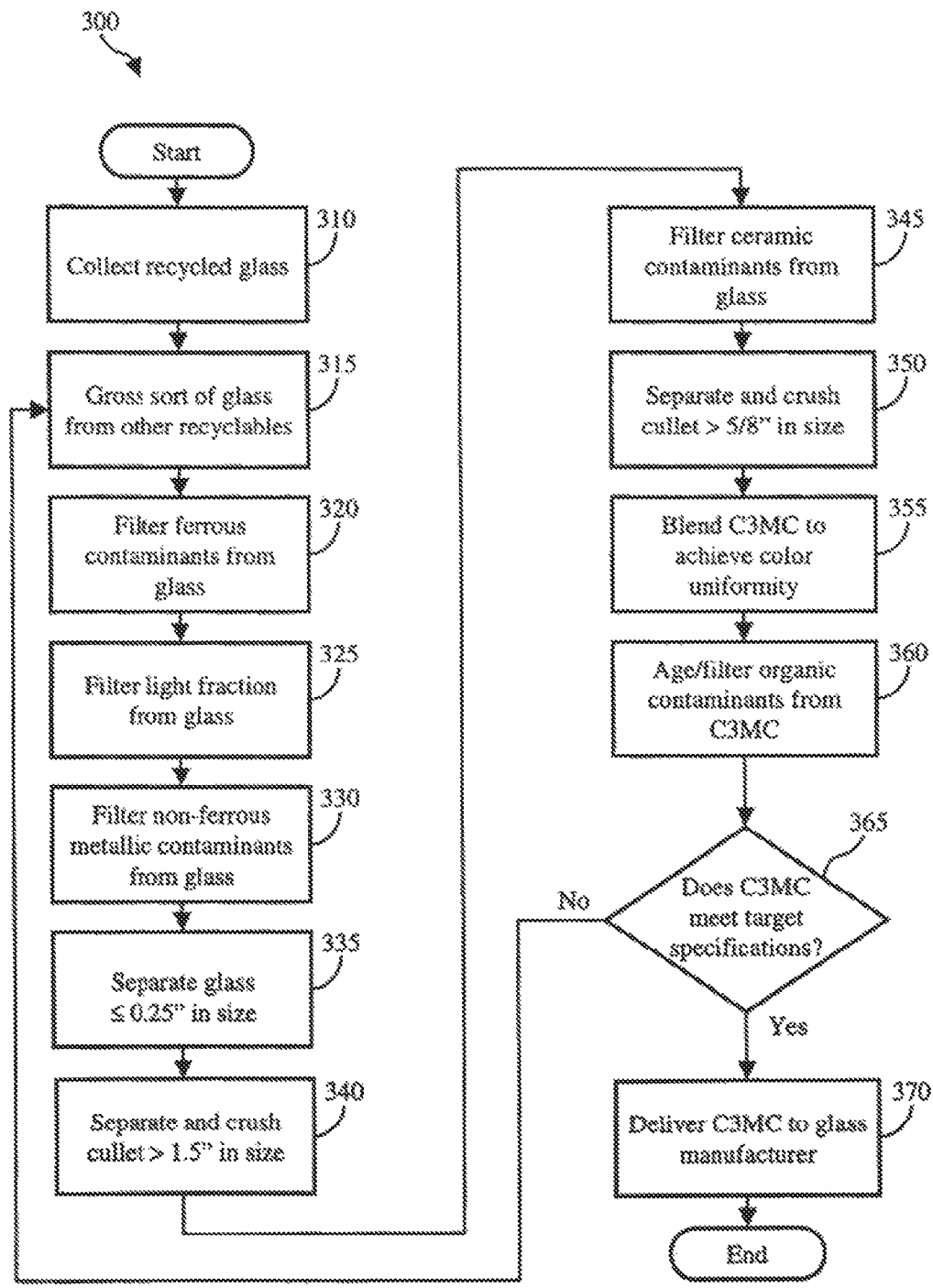
FIG. 3 illustrates a flow diagram of an exemplary method of providing substantially uniformly colored, substantially contaminant-free mixed cullet, in accordance with an embodiment of the invention.

FIG. 3 illustrates a flow diagram of an exemplary method of providing substantially uniformly colored, substantially contaminant-free mixed cullet, in accordance with an embodiment of the invention. At step 310, post-consumer glass is collected. For example, recycled glass is collected by solid municipal waste companies at curbside pickup.

At step 315, the recycled glass is grossly sorted from the other recyclables (e.g., paper, plastic, ceramics, and metal). For example, the glass products are sorted by hand at MRF 116a-c, and delivered, for example, to glass beneficiator 110a-c for additional separation and/or processing (as described, for example, in steps 320 through 365).

At step 320, ferrous materials are filtered from the glass mixture. For example, the ferrous contaminants may be removed via standard magnetic separation techniques. At step 325, light materials, such as paper and plastics, are filtered from the glass mixture. Techniques such as vacuuming and/or blowing, using a standard air classification system, may be utilized.

At step 330, non-ferrous metallic contaminants, such as aluminum, are filtered from the glass mixture by, for example, a standard eddy current separation system. At this point, the glass product is substantially free of plastic, paper, and metal contaminants, but may still contain ceramic and/or organic contaminants. For example, a KSP sorter from Binder and Co., can be used to separate out non-glass material such as ceramic, stone, porcelain, aluminum and/or lead.

At step 335, glass that is less than or equal to approximately 0.25 inches within the glass mixture is separated from the stream, since glass less than approximately 0.25 inches in generally too small to be sorted. The cullet less than or equal to approximately 0.25 inches may be separated, for example, by passing the stream through a screen with 0.25-inch grids. The glass less than or equal to approximately 0.25 inches may be further purified by using, for example, imaging and infrared transmission methods, such as discussed in connection with step 345. In addition, the glass less than or equal to approximately 0.25 inch may, for example, be ground, for example, to 40 mesh and returned to the main glass stream as fines. In addition, the glass less than or equal to approximately 0.25 inch may be used, for example, in asphalt.

At step 340, glass that is greater than approximately 1.5 inches in size is separated from the glass mixture, crushed to a size of less than 1.5 inches, and returned to the glass flow stream. The cullet is separated, for example, by passing the stream through a screen with, for example, approximately, 1.5-inch grids. The crushing operation is performed, for example, by a standard industrial jaw crusher such as is commonly used in the glass industry for crushing cullet and/or used in the mineral processing industry for crushing ore. The industrial jaw crusher is a well-known size-reduction apparatus using an aperture between two reciprocating plates. The jaw crusher serves as a screen for the maximum particle size.

At step 345, ceramic contaminants are filtered from the glass mixture by, for example, imaging and/or infrared transmission techniques. For example, the cullet stream may be passed through an optical or infrared transmission device with a feedback system and a series of air jets. As the cullet stream passes between the optical source and the detector, the transmission of each particle is measured. Clear glass particles are allowed to pass, and the opaque ceramic particles are identified and ejected with a quick burst of air from the jets. For efficient separation of the ceramic, a closed circuit scanning system can be utilized with a large (e.g., 300%-600%) circulating load.

Typically, two optical or infrared detection devices are employed in each closed circuit ceramic elimination system. The first optical device may function as the exit gate to the circuit, and be configured with a discrimination coefficient that permits glass to exit the circuit by positive sort. The circulating load contains mostly glass with some level of ceramic contamination. The second optical detection device can examine the circulating load and removes opaque (ceramic or other non-glass) particles by positive sort, thus preventing ceramic levels from building up in the circulating load and allowing an exit point for ceramic particles. The cleaned glass exiting this closed loop system is then sent to a second set of optical cleaning devices for "polishing" of the stream. These devices may be similar transmission devices as described above, or they may be more advanced optical imaging devices aimed at identifying and eliminating ceramic contamination by optical imaging in combination with air jet ejection.

An exemplary ceramic contaminant specification is provided in Table 1.

TABLE 1

Exemplary Mixed Cullet Ceramic Contaminant Target Specifications

| Ingredient | Target Specification |
|---|---|
| Ceramic contamination, all samples | ≤5 g/ton |

At step 350, cullet that is greater than approximately 0.625 inches is separated from the glass mixture, crushed to a size of less than approximately 0.625 inches, and returned to the glass flow stream. The cullet is separated, for example, by passing the stream through a screen with grids having a size of approximately 0.625 inches. The crushing operation is performed, for example, by a standard industrial jaw crusher, as discussed above (in connection with step 340). The industrial jaw crusher is a well-known size-reduction apparatus using an aperture between two reciprocating plates, and serves as a screen for the maximum particle size.

At step 355, the processed mixed cullet or clean three-color mixed cullet (C3MC) can be blended with other C3MC that has been accumulated over a period of time. The nature of the blending operation depends on the variability of the cullet. Cullet storage piles are developed at the cullet processing site for the purpose of both aging the cullet, as described in step 360, and for blending. A single conical stockpile, or several such stockpiles, are effectively used as a blending vehicle by adding to the stockpile at the vertex and removing from the stockpile in vertical slices with, for example, a front loader. Scoops from multiple piles are blended in a single shipment to dampen and eliminate the material variability in shipments to glass plants. Stockpiles of 5,000-10,000 tons size are typical for glass processing facilities shipping 100,000 tons per year.

The color distribution of C3MC is generally geographically dependant. Thus, each processor's geographical region may have its own specification. Exemplary color uniformity specifications are further illustrated in Table 2.

TABLE 2

Exemplary C3MC Color Uniformity and Purity Target Specifications

| Ingredient | Target Specification |
|---|---|
| Green cullet sample-to-sample | ±5% from given spec |
| Green cullet short-term | ±10% from given spec |
| Green cullet long-term | ±20% from given spec |
| Amber cullet sample-to-sample | ±5% from given spec |
| Amber cullet short-term | ±10% from given spec |
| Amber cullet long-term | ±20% from given spec |

Notes: Sample size for color measurement is 10 kg. Smaller analytical specimens can be obtained from the 10 kg sample by, for example, splitting and quartering.
Definition: Short term is, for example, 2–6 weeks. Long term is, for example, 6 weeks or greater.

The color specifications of Table 2 are given for a 10 kg C3MC sample. An example processor's geographical region specification may include a C3MC supply that has approximately 22% green cullet, 30% amber, and 48% flint. Applying the target specification of Table 2 to this example, the sample-to-sample percent green cullet may vary from 20.9% to 23.1%. The short-term percent green cullet may vary from 19.8% to 24.2%, and the long-term percent green cullet may vary from 17.6% to 26.4%. The sample-to-sample percent amber cullet may vary from 28.5% to 31.5%. The short-term percent amber cullet may vary from 27% to 33%, and the long-term percent amber cullet may vary from 24% to 36%.

At step 360, the C3MC is amassed and aged for approximately 2 to 4 weeks. Much of the organic contamination that remains from after completing step 345 is in the form of polysaccharide food residues that are subject to breakdown by biological action in the process of fermentation. By amassing the material in large storage piles, either indoors or outdoors, the natural yeasts and biological agents in the organic glass contaminants commence an exothermic fermentation process that converts polysaccharide impurities to simple sugars, and ultimately to alcohol and $CO_2$ gas, both of which readily disperse in the air. The heat generated by the process raises the temperature, e.g., from 15° C. to 35° C., thus accelerating the process. This aging process is effective in reducing the organic level in the glass mixture. The organic contaminant specification is further illustrated in Table 3.

TABLE 3

Exemplary Mixed Cullet Organic Contaminant Target Specifications

| Ingredient | Target Specification |
|---|---|
| Organic contamination, general specification | ±2 lbs./ton |
| Organic contaminant, instantaneous sample-to-sample variability | ±0.25 lbs./ton |
| Organic contaminant, short-term variability | ±.25 lbs./ton |
| Organic contaminant long-term | ±1.0 lb./ton |

Note: organic contamination levels are specified on a per ton of glass cullet basis. Sampling for organic measurements typically requires a minimum 2 kg samples representatively collected from shipments or storage piles.
Definition: Short term is, for example, 2–6 weeks. Long term is, for example, 6 weeks or greater.

Figure 4:
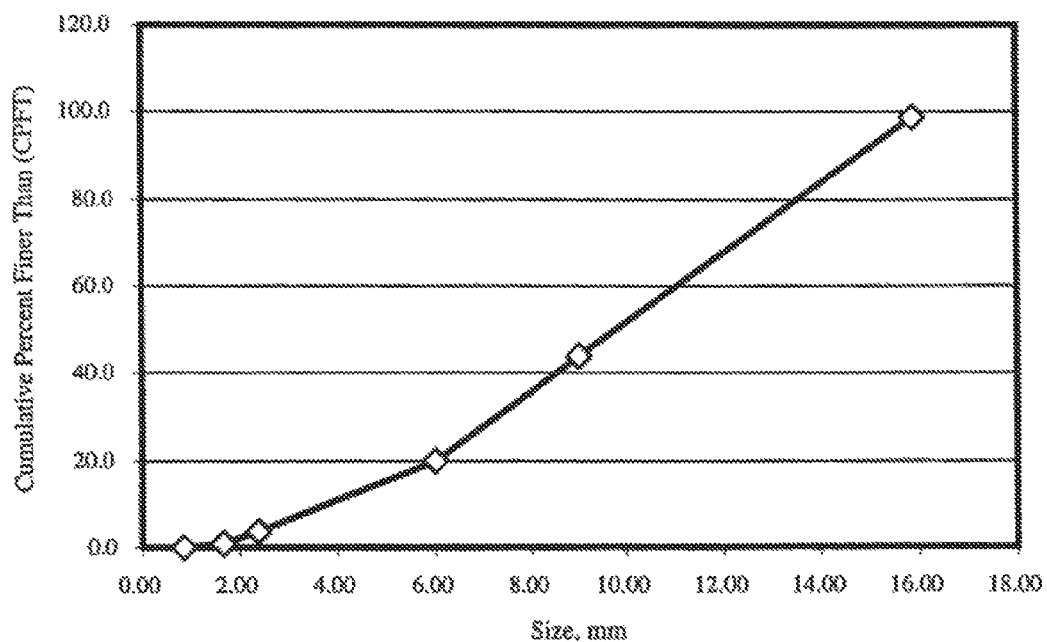
FIG. 4 illustrates an exemplary plot of expected cumulative percent finer than (CPFT) vs. C3MC particle size.

At decision step 365, by examining the analytical measurements, a determination is made as to whether the final C3MC material prepared for shipment meets the target specifications of, for example, Tables 1, 2, and/or 3. Furthermore, whether the final C3MC material meets the expected particle-size range, which is typically between 1 and 16 mm, as is shown in FIG. 4, can also be determined. More specifically, FIG. 4 shows the expected cumulative percent finer than (CPFT) vs. C3MC particle size (in millimeters). At decision step 365, if target specifications are not met, then the process returns to step 315. If target specifications are met, then, at step 370, the C3MC meeting the specifications of Tables 1, 2, and/or 3, which are generally summarized in Table 4, is delivered, for example, to glass plant 118.

TABLE 4

Average Expected Contaminant Levels Within the C3MC

| Contaminant | Nominal | Low | High |
|---|---|---|---|
| Moisture, % | 1.0 | 0.5 | 2.0 |
| Aluminum, g/ton | 0 | 0 | 1 |
| Ceramics, g/ton | 5 | 1 | 15 |
| Organics*, lbs/ton | 2 | 1 | 4 |

*organics are typically a mixture of polysaccharide and polyolefin materials that average approximately 50% carbon.

Moisture content of the C3MC material is typically not controlled. Instead, it is measured and reported. The C3MC material is sufficiently coarse that water typically drains out. Therefore, special precautions are generally not needed. C3MC typically saturates under standard conditions at ≤2%.

Figure 5:
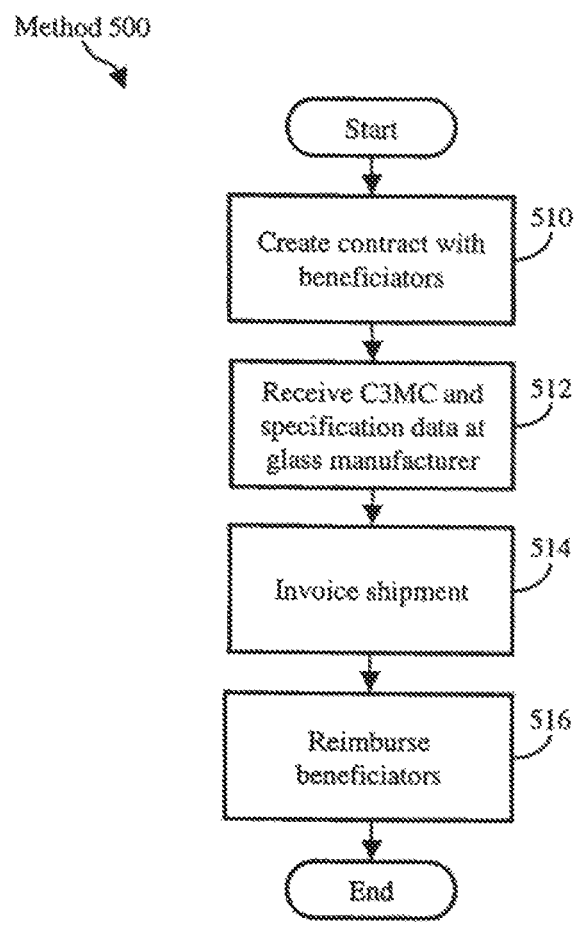
FIG. 5 illustrates a flow diagram showing exemplary entity interactions during the process of providing mixed cullet characterization and certification for batch formulations.

FIG. 5 illustrates a flow diagram showing exemplary entity interactions during the process of providing mixed cullet characterization and certification for batch formulations. At step 510, beneficiators 110a-c contract, or engage in another business arrangement, with glass plant 118 to supply a quantity and quality of C3MC. Price break points can be established, for example, as a function of C3MC composition. For example, a blend of C3MC stockpile 120 may consist of approximately 55% flint, 30% amber, and 15% green. This blend may generate maximum revenue for glass plant 118. In addition to this composition, additional price breaks for decreasing percentages of flint glass content in the C3MC, for example, may be established at a corresponding discounted cost of material.

At step 512, glass plant 118 receives a shipment of C3MC from beneficiators 110a-c, and the associated specification data corresponding to each shipment load, from controllers 114a-c to batch controller 128 via, for example, a standard computer network or internet connection.

At step 514, beneficiators 110a-c, respectively, invoice glass plant 118 for the shipment of C3MC provided in step 512. The invoice fee may be based, for example, on the stored C3MC specification data from within batch controller 128 that corresponds to each load and the cost-per-quantity break point determined in step 510.

At step 516, glass plant 118 reimburses beneficiators 110a-c, respectively, for the shipment of C3MC provided in step 512, in accordance with the invoice delivered in step 514.

The invention claimed is:

1. A method of creating a batch of recycled glass from mixed color recycled glass cullet, the method comprising:
   receiving target specification data for mixed color recycled glass cullet from a glass plant;
   receiving a first batch of mixed color recycled glass cullet provided by a first processing facility having a first color composition percentage, the first batch of mixed color recycled glass cullet comprising flint, green, and amber glass;
   receiving a second batch of mixed color recycled glass cullet provided by a second processing facility having a second color composition percentage, the second batch of mixed color recycled glass cullet comprising flint, green, and amber glass; and
   generating, after the receiving the target specification data, a third batch of mixed color recycled glass cullet, the third batch of mixed color recycled glass cullet having specification data consistent with the target specification data, the generating including blending a first amount of the first batch of mixed color recycled glass cullet with a second amount of the second batch of mixed color recycled glass cullet, the first amount of the first batch of mixed color recycled glass cullet calculated at least in part by the first color composition of the first batch of mixed color recycled glass cullet, the second amount of the second batch of mixed color recycled glass cullet calculated at least in part by the second color composition percentage of the second batch of mixed color recycled glass cullet;
   combining a portion of the third batch of mixed color recycled glass cullet with plant scrap to form a further color composition; and
   adjusting the further color composition by combining raw materials with the third batch of mixed color recycled glass cullet and the plant scrap.

2. The method of claim 1, further comprising:
   producing glass at the glass plant, using at least the third batch of mixed color recycled glass cullet; and
   determining a glass coloring oxide agent level to produce a desired color of a glass product, the glass product including at least a portion of the third batch of mixed color recycled glass cullet.

3. The method of claim 2, wherein the glass coloring oxide agent is copper oxide.

4. The method of claim 1, further comprising producing glass at the glass plant, using at least the third batch of mixed color recycled glass cullet; wherein the produced glass has a desired transmission property.

5. The method of claim 4, further comprising determining a glass coloring oxide agent level to produce the desired transmission property.

6. The method of claim 1, wherein the at least one of the first color composition percentage and the second color composition percentage is analyzed by at least one optical imaging device.

7. The method of claim 1, further comprising storing the at least one of the first color composition percentage, the second color composition percentage, and the third color composition percentage for use on a specification sheet.

8. A method of creating a consistent feed stream to glass plant of mixed color recycled glass cullet, the method comprising:
   receiving a first batch of recycled glass provided by a first processing facility, the first batch of recycled glass comprising flint, green and amber glass;
   removing contaminants from the first batch of recycled glass;
   separating a first portion of glass from the first batch of recycled glass, the first portion of glass including pieces of glass greater than approximately 0.625 inches in size;
   crushing said separated first portion of glass to a piece size of less than 0.625 inches;
   returning, after the crushing, said first portion of glass to the first batch of recycled glass;
   measuring the color composition percentage of the first batch of recycled glass; and
   combining a first portion of the first batch of recycled glass with a second portion of a second batch of recycled glass provided by a second processing facility having a second color composition percentage to generate a third batch of recycled glass having a third color composition percentage, the second batch of recycled glass comprising flint, green and amber glass, the third color composition percentage being consistent with a color composition percentage specified by a glass plant before the combining;
   combining a portion of the third batch of recycled glass with plant scrap to form a further color composition; and
   adjusting the further color composition by combining raw materials with the third batch of recycled glass and the plant scrap.

9. The method of claim 8, wherein the at least one of the first color composition percentage and the second color composition percentage is analyzed by at least one optical imaging device.

10. The method of claim 8, further comprising storing the at least one of the first color composition percentage, the second color composition percentage, and the third color composition percentage for use on a specification sheet.

11. The method of claim 8, wherein the third color composition percentage of the third batch of recycled glass is consistent with the specified color composition percentage when the third color composition percentage of the third batch of recycled glass is (1) equal to the specified color composition percentage, or (2) within a predetermined percentage range identified by the specified color composition percentage.

12. The method of claim 1, wherein the target specification data includes at least one of one of a color specification, purity specification, and contaminant specification.

13. The method of claim 1, wherein the specification data of the third batch of mixed color recycled glass cullet is consistent with the target specification data when the specification data of the third batch of mixed color recycled glass cullet is (1) equal to the target specification, or (2) within a predetermined percentage range identified by the target specification.

14. The method of claim 1, wherein the specification data of the third batch of mixed color recycled glass cullet includes data associated with a third color composition percentage of the third batch of mixed color recycled glass cullet, the third color composition percentage of the third batch of mixed color recycled glass cullet is consistent with a specified color composition percentage included in the target specification data such that the third batch of mixed color recycled glass cullet can be used in a glass production process by the glass plant, the glass production process having determined a glass coloring oxide agent level before the generating the third batch of mixed color recycled glass cullet.

15. The method of claim 1, further comprising:
reducing the organic content of the third batch of mixed color recycled glass cullet.

16. The method of claim 8, further comprising:
reducing the organic content of the third batch of mixed color recycled glass cullet.

* * * * *